(12) United States Patent
Reineck

(10) Patent No.: US 7,175,190 B2
(45) Date of Patent: Feb. 13, 2007

(54) HORIZONTAL MOUNT OF SUSPENSION ELEMENT TO AXLE

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 296 days.

(21) Appl. No.: 10/812,460

(22) Filed: Mar. 30, 2004

(65) Prior Publication Data

US 2005/0218620 A1   Oct. 6, 2005

(51) Int. Cl.
*B60G 7/00* (2006.01)
*B60G 11/00* (2006.01)
*B60G 11/02* (2006.01)

(52) U.S. Cl. .......................... 280/124.17; 280/124.175
(58) Field of Classification Search ........... 280/124.17, 280/124.175, 124.163; 267/36.1, 52
See application file for complete search history.

(56) References Cited

U.S. PATENT DOCUMENTS

| | | | | |
|---|---|---|---|---|
| 366,425 A * | 7/1887 | Partridge | ...................... | 267/52 |
| 379,839 A * | 3/1888 | White | ..................... | 267/52 |
| 881,933 A * | 3/1908 | Kramer | ..................... | 267/52 |
| 1,050,138 A * | 1/1913 | Houdaille | ..................... | 267/52 |
| 1,189,590 A * | 7/1916 | Loomis | ..................... | 267/52 |
| 2,741,491 A * | 4/1956 | Van Raden | ............... | 280/682 |
| 2,745,661 A * | 5/1956 | Van Raden | ................... | 267/52 |
| 3,080,161 A * | 3/1963 | Felburn | ..................... | 267/52 |
| 3,144,246 A * | 8/1964 | Hamlet | ..................... | 267/52 |
| 3,151,854 A * | 10/1964 | Felburn | ..................... | 267/52 |
| 3,154,323 A * | 10/1964 | Hooven | ............. | 280/124.176 |
| 3,231,291 A * | 1/1966 | Kozicki et al. | ............... | 267/52 |
| 3,304,096 A * | 2/1967 | Hanover | ..................... | 280/682 |
| 3,493,222 A * | 2/1970 | Mathers et al. | ............. | 267/270 |
| 3,704,876 A * | 12/1972 | Schubeck | ..................... | 267/66 |
| 3,843,148 A * | 10/1974 | Wright | ..................... | 280/86.5 |
| 4,519,590 A * | 5/1985 | Wells | ..................... | 267/52 |
| 4,630,804 A * | 12/1986 | Fesko | ..................... | 267/52 |
| 4,684,110 A * | 8/1987 | Sale et al. | ..................... | 267/52 |
| 4,801,129 A * | 1/1989 | Wells | ..................... | 267/52 |
| 4,895,350 A * | 1/1990 | Schoof et al. | ..................... | 267/52 |
| 5,046,756 A * | 9/1991 | Hertrick | ..................... | 280/86.75 |
| 5,599,038 A * | 2/1997 | German | ............... | 280/124.175 |
| 5,921,570 A * | 7/1999 | Lie | ..................... | 280/124.175 |
| 6,406,008 B1 * | 6/2002 | Dudding et al. | ............. | 267/52 |
| 6,966,568 B2 * | 11/2005 | Wen et al. | ............. | 280/124.175 |
| 6,991,223 B2 * | 1/2006 | Platner et al. | ................. | 267/47 |
| 2004/0155424 A1 * | 8/2004 | Hicks et al. | ........... | 280/124.17 |

* cited by examiner

*Primary Examiner*—Paul N. Dickson
*Assistant Examiner*—Joselynn Y. Sliteris
(74) *Attorney, Agent, or Firm*—Carlson, Gaskey, & Olds

(57) ABSTRACT

A clamp arrangement is utilized to secure a suspension element to an axle. The clamp arrangement includes a pair of spaced clamp halves that are tightened to cam a pair of holding frame elements together and hold the suspension element to the axle. Preferably, a pair of clamp halves is positioned on each side of the axle such that they do not take space beneath the axle. In this manner, ground clearance is increased over the prior art.

11 Claims, 3 Drawing Sheets

US 7,175,190 B2

HORIZONTAL MOUNT OF SUSPENSION ELEMENT TO AXLE

BACKGROUND OF THE INVENTION

This invention relates to a mount for attaching a suspension element to an axle, wherein little space is required beneath the axle, since the attachment elements are on the axle sides.

Modern heavy vehicles are typically provided with an axle extending laterally across the vehicle. Suspension elements connect the axle to a vehicle frame, and to a bias element such as a spring or shock. In heavy vehicles, these axles may be fixed and attach rotating wheels at each lateral end. The connection of the suspension elements to the axle must be secure and rigid, such that forces transmitted to the axle are transmitted into the suspension elements, and such that the suspension elements can resist or otherwise accommodate these forces.

Historically, as shown in FIG. 1A, suspension elements have been attached to an axle 11 with U-bolts 13. Generally, a U-bolt includes a U-shaped bolt having two threaded legs. Each U-bolt 13 is inserted over a frame element 15 and into openings in the top of the axle 11. The suspension element 7 is captured between the frame element 15 and the axle 11. Nuts are tightened onto the threaded legs of the U-bolts 13, and secure the suspension element to the axle.

Recently, fabricated and tubular axles have been developed that require a different clamp arrangement. One such axle 9 may be seen in FIG. 1B. U-bolts 10 are inserted over a frame element 12 on one vertical face of the axle 9, and into openings in another frame element 17 on an opposed vertical face of the axle 9. The suspension element 7 is captured between the frame element 12 and the axle 9. The threaded legs of the U-bolts 10 receive nuts and extend underneath the axle, and thus take up space beneath the axle, and reduce ground clearance. It may sometimes be beneficial for a designer to have additional clearance beneath the axle, and thus the prior art U-bolts have not provided all of the design freedom that would be desirable.

Further, prior art U-bolts typically require periodic re-torquing, as there may be adjustment or loosening of the nuts. This is also undesirable.

SUMMARY OF THE INVENTION

In the disclosed embodiment of this invention, a clamp secures a suspension element to an axle with clamp elements arranged on the side of the axle. In a preferred embodiment, there are clamp elements on each side of the axle. The clamp elements secure holding frame members, which hold the suspension element on the axle. More preferably, the clamp elements have angled sides which cam or wedge angled sides on the holding frame members. The angled surfaces wedge the frame members toward each other as a bolt is tightened, providing a secure connection of the suspension element to the axle.

In a most preferred embodiment, one of the two holding frame elements receives the suspension member, with the suspension member extending through a channel in the one holding frame element. Preferably, the suspension member is closely guided in this channel, such that it is securely held.

These and other features of the present invention can be best understood from the following specification and drawings, the following of which is a brief description.

DETAILED DESCRIPTION OF THE PREFERRED EMBODIMENT

Figure 1A:
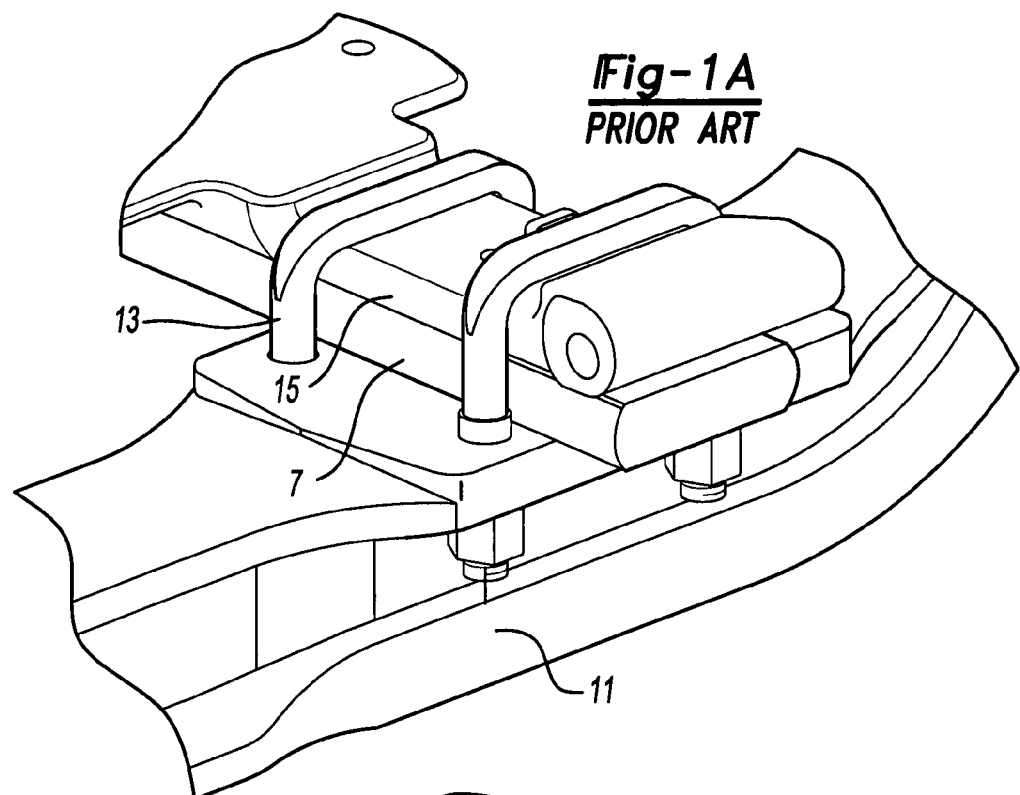
FIG. 1A shows a first prior art arrangement.
Figure 1B:
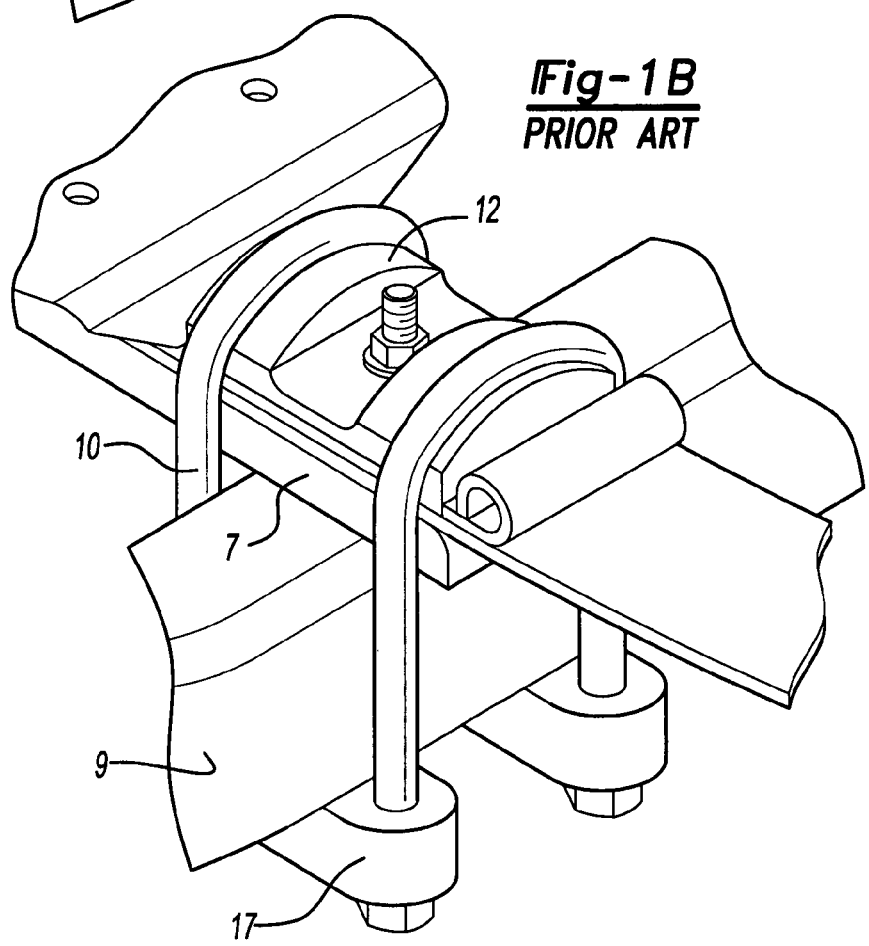
FIG. 1B shows a second prior art arrangement.
Figure 2:
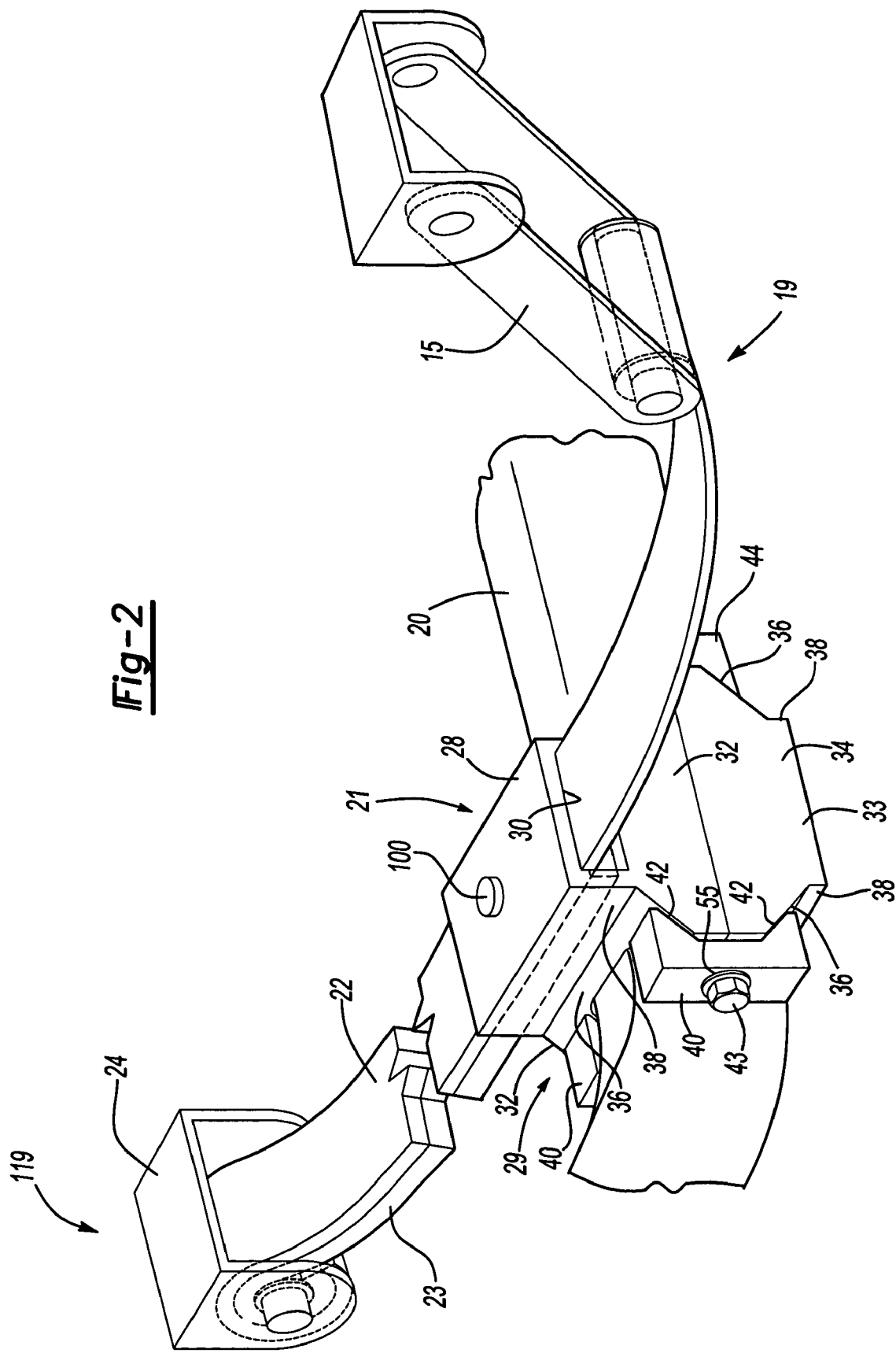
FIG. 2 shows a perspective view of an inventive axle and suspension mount.

An axle 20 is illustrated in FIG. 2 secured to a suspension element 21. As known, there are preferably suspension elements at each lateral end of the axle 20, although only a single suspension element 21 is illustrated in FIG. 2. In the illustrated embodiment, suspension element 21 has an upper spring member 22 and a more rigid underlying element 23. As shown, upper spring member 22 has a rear end 19 mounted through a pivot 15, as known. Underlying element 23 carries a forward bushing mounted in frame member 24 at forward end 119.

The suspension element 21 is secured to the axle 20 through a clamping arrangement 29, including an upper holding frame element 28 having a channel 30. As can be seen, the suspension element 22 extends through the channel 30, and underlying element 23 is received within the channel 30. Thus, the suspension element 21 is closely received in the channel 30.

Figure 3:
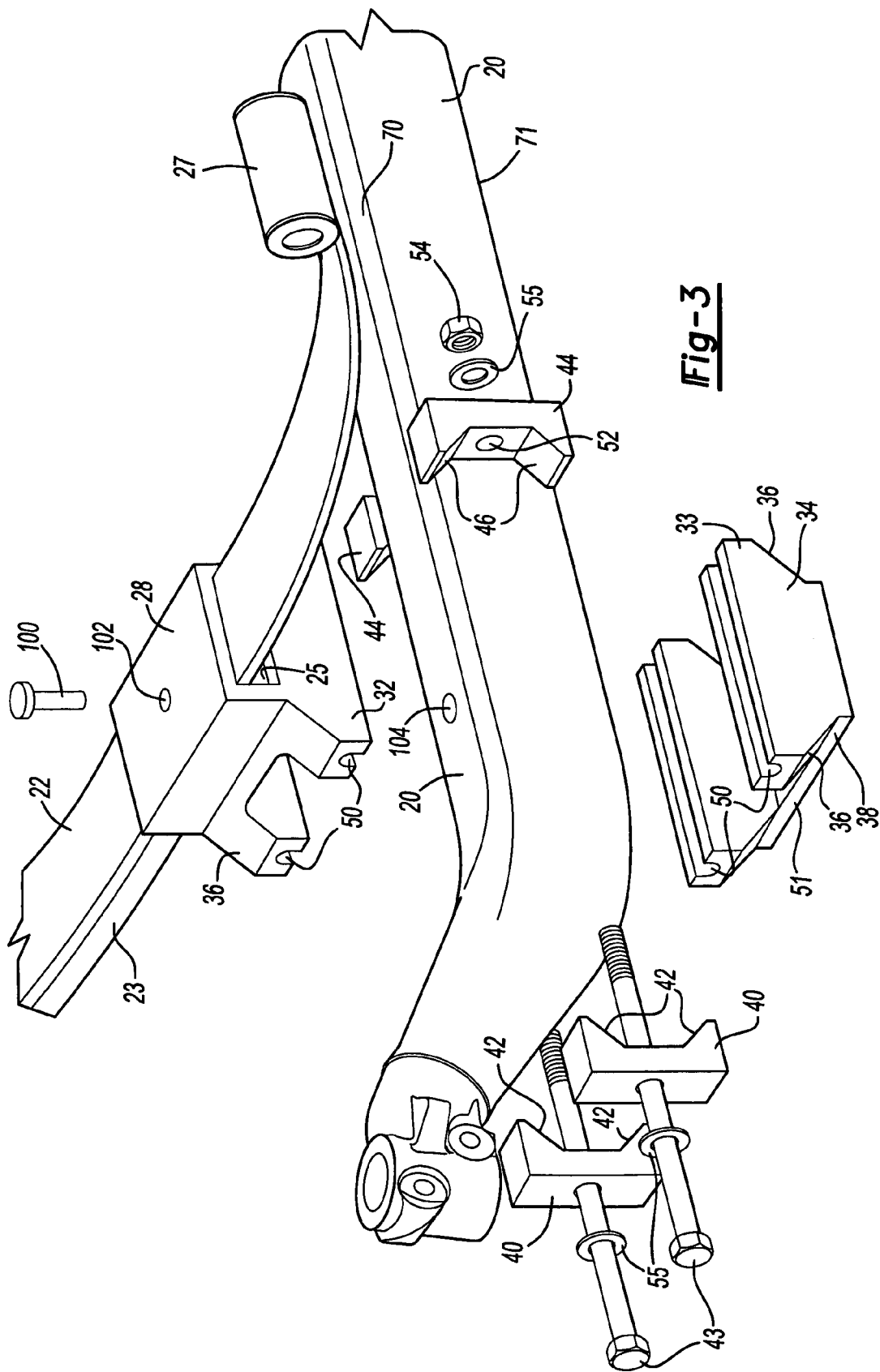
FIG. 3 shows an exploded view of the FIG. 2 embodiment.

Upper holding frame element 28 has side pieces 32. A lower holding frame element 33 having side pieces 34 is positioned beneath the axle 20. As shown in FIGS. 2 and 3, holding frame element side pieces 32 and 34 have angled surfaces 36, and outer edges 38. Clamp halves 40 have similar angled sides 42 which cam along the surfaces 36 when a bolt 43 is tightened into second clamp halves 44. Bolt 43 is positioned within a vertical extent of the axle and between upper and lower surfaces, and moves in a direction to secure the clamp in a direction having at least a component in a lateral direction along the length of the axle. Second clamp halves 44 include similar angled surfaces 46. Preferably, the clamp halves 40 and 44 end inwardly of the outermost edges 38 of the upper and lower frame element side pieces 32 and 34.

As can be appreciated in FIG. 2, there is little structure beneath the axle 20 in this embodiment. Notably, while the suspension element is mounted above the axle 20, in certain arrangements, the suspension element may be mounted beneath the axle. Even so, by eliminating the requirement of the bolts, etc. to be vertically below the axle 20, the present invention still increases ground clearance even for a vertically lower mounted suspension element.

Further, with the unique arrangement, a camming or wedging action occurring between the surfaces 36 and 42 and 36 and 46 ensures the holding frame elements 28 and 33 tightly secure the suspension element 21 to the axle 20. It is expected that periodic re-torquing will not be required, and at least would not be required as frequently as is required with the prior art U-bolts.

As can also be appreciated from FIG. 2, one end of the suspension element 21 is secured to a frame bracket 24, shown schematically. The connection of this end is as known in the art.

FIG. 3 is an exploded view and shows further detail. As can be seen, there are half-bolt channels 50 formed in the upper side pieces 32, and in the lower side pieces 34. As can also be appreciated, a connecting web 51 connects the lower side pieces 34.

The clamp halves 44, 40 each include a bolt hole 52 to receive the bolt 43. As shown, a nut 54 is threaded onto the bolt 43. As can be appreciated, the bolt 43 and nut 54 are within the vertical extent of the axle 20, or stated another way, intermediate the upper end 70 and lower end 71 of the axle 20. In this manner, no structure related to the bolts 43 or nuts 54 extends beneath the axle 20. Securement elements other than bolts may be used.

As further shown in FIG. 3, washers 55 and nuts 54 on bolts 43 will force the clamp halves 40, 44 to move toward the holding frame elements 28 and 33 as the bolts 43 are secured in the nuts 54. This will further ensure the camming action to tightly hold the holding frame elements 28 and 33 on the axle 20.

Pin 100 passes through holes 102 and 104, and a corresponding hole in the spring member 22 to initially align these members.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An axle and suspension element combination comprising:
   an axle extended between lateral ends and having upper and lower surfaces and sides extending between said upper and lower surfaces;
   a suspension element attachable to a vehicle frame;
   said suspension element being secured to said axle by a clamp including a securement member to secure said clamp, and hold said suspension element on said axle, said securement member being positioned on at least one side of said axle;
   said securement member is a threaded member; and
   said clamp includes two spaced clamp halves, and said threaded member extends through both of said two spaced clamp halves, said suspension element being supported in at least one frame member, said at least one frame member secured to said axle by said two spaced clamp halves.

2. A combination as set forth in claim 1, wherein said two spaced clamp halves have angled surfaces that move along mating angled surfaces on said at least one frame member to cam said at least one frame member onto said axle.

3. A combination as set forth in claim 2, including a second frame member also having angled surfaces, with said angled surfaces on said two spaced clamp halves camming both said frame members toward each other.

4. A combination as set forth in claim 3, wherein a vertical extent of said second frame member extends beyond a vertical extent of said two spaced clamp halves.

5. A combination as set forth in claim 3, wherein said two spaced clamp halves are movable relative to said axle.

6. A combination as set forth in claim 1, wherein said securement member is positioned within a vertical extent of said axle, and between said upper and lower surfaces.

7. An axle and suspension element combination comprising:
   an axle extended between lateral ends and having upper and lower surfaces and two sides extending between said upper and lower surfaces;
   a suspension element attachable to a vehicle frame; and
   said suspension element being secured to said axle by a clamp on each of said sides, said clamps each including two spaced clamp halves, with a threaded member extending through both of said spaced clamp halves and on each of said sides, said suspension element being supported in at least one frame member, said clamps securing said at least one frame member to said axle.

8. A combination as set forth in claim 7, wherein said two spaced clamp halves have angled surfaces that move along mating angled surfaces on said at least one frame member to cam said at least one frame member onto said axle.

9. A combination as set forth in claim 8, wherein there is also a second frame member, said second frame member also having angled surfaces, with said angled surfaces on said spaced clamp halves camming both said frame members toward each other.

10. A combination as set forth in claim 9, wherein a vertical extent of said second frame member extends beyond a vertical extent of said two spaced clamp halves.

11. A combination as set forth in claim 9, wherein said two spaced clamp halves are movable relative to said axle.

* * * * *